No. 831,452. PATENTED SEPT. 18, 1906.
T. N. MATHIAS.
BLANKET.
APPLICATION FILED OCT. 30, 1905.

2 SHEETS—SHEET 1.

Witnesses
C. M. Jensen
A. Rosgen

Inventor
THEODORE N. MATHIAS,
By Attorney G. C. Kennedy.

No. 831,452. PATENTED SEPT. 18, 1906.
T. N. MATHIAS.
BLANKET.
APPLICATION FILED OCT. 30, 1905.

2 SHEETS—SHEET 2.

Witnesses
C. M. Jensen
A. Rosgen

Inventor
THEODORE N. MATHIAS,
By Attorney
G. C. Kennedy.

UNITED STATES PATENT OFFICE.

THEODORE N. MATHIAS, OF MILWAUKEE, WISCONSIN.

BLANKET.

No. 831,452.  Specification of Letters Patent.  Patented Sept. 18, 1906.

Application filed October 30, 1905. Serial No. 285,069.

*To all whom it may concern:*

Be it known that I, THEODORE N. MATHIAS, a citizen of the United States of America, and a resident of Milwaukee, Milwaukee county, Wisconsin, have invented certain new and useful Improvements in Blankets, of which the following is a specification.

My invention relates to blankets; and the object of my invention is to provide a horse-cover which has a crupper attached and which will retain its place on the animal and not become shifted as a result of the horse coming in contact with any extraneous object or because of restless movements. This object I have accomplished by the means which are hereinafter described and claimed and which are illustrated in the accompanying drawings, in which—

Figure 1:
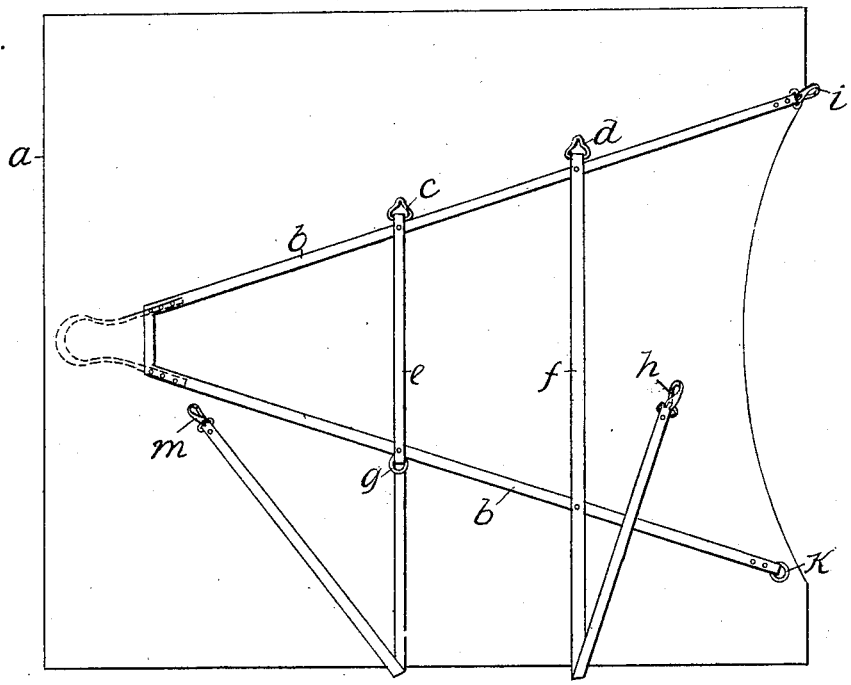
Figure 2:
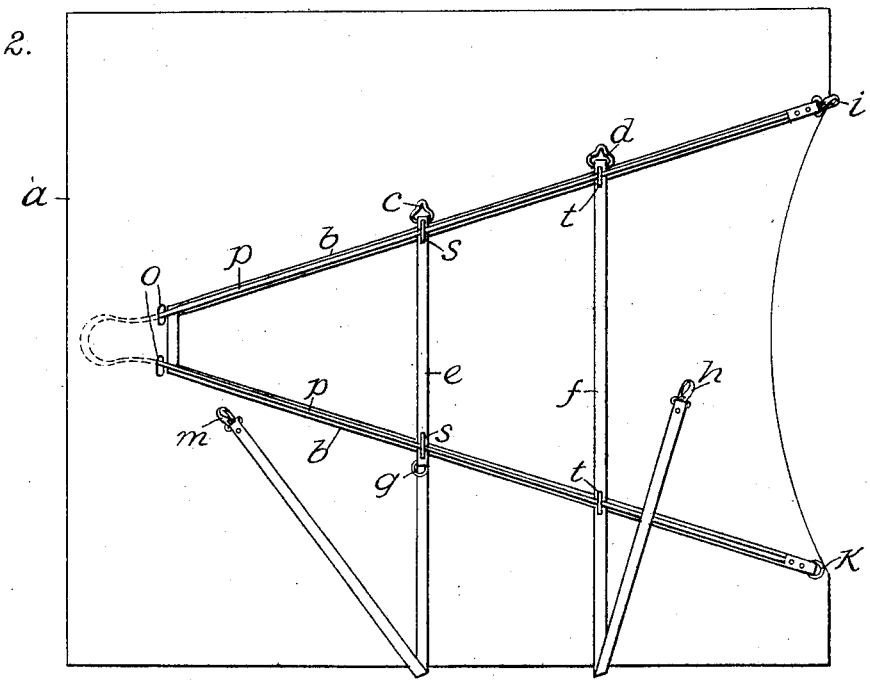
Figure 3:
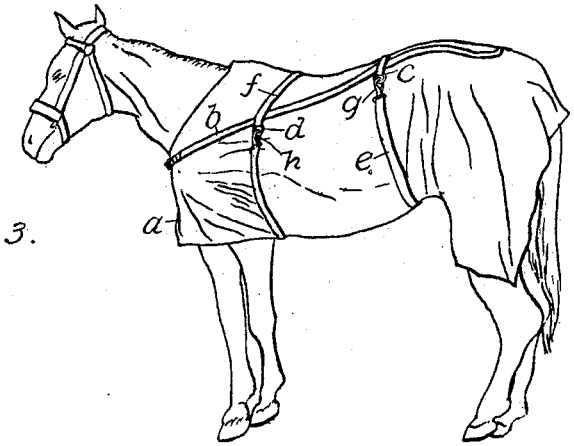
Figure 4:
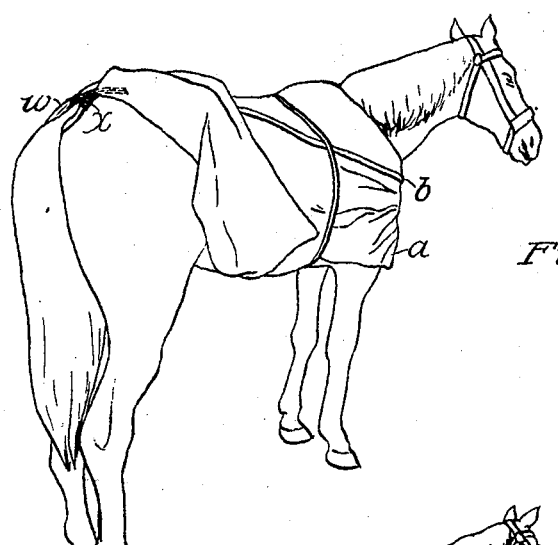
Figure 5:
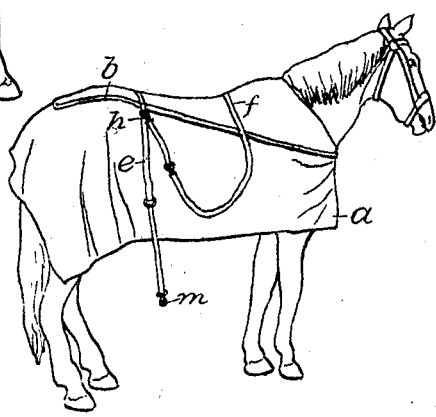

Figure 1 is a plan view of the upper surface of my improved blanket. Fig. 2 is another plan view showing a modified construction of the blanket. Fig. 3 is a view of the blanket buckled about a horse. Fig. 4 is a view of the same with the blanket turned back to show the crupper; and Fig. 5 is another view showing the blanket hung loosely on a horse, as is the custom in summer.

Similar letters refer to similar parts throughout the several views.

I have shown a V-shaped strap $b$ attached to the blanket $a$, although the use of such a strap is not absolutely essential, for the ends of the crupper may be attached directly to the blanket or to a place thereon reinforced by a piece of leather or similar material. When such a strap is used, it is effective as a lengthwise stay between the crupper and the strap around the horse's breast and prevents strain upon or tearing of the blanket.

The crupper $w$ is fastened by stitching or riveting its rear ends to the rear part of the V-shaped strap $b$ and is provided with buckles $x$, whereby it may be detachably fastened about the root of the animal's tail to anchor the rear part of the blanket and prevent its displacement.

As additional fastening means I have shown the girths $e$ and $f$, having rings $c$ and $d$, also clips $m$ and $h$, respectively, and the girth $e$ has an additional ring $g$ to support the clips $m$ and $h$ when the ends of the girths $e$ and $f$ are allowed to hang loose. The ends of the V-shaped strap $b$ have the ring $k$ and the clip $i$, with which the blanket may be fastened about the breast of the animal.

I have shown in Fig. 2 another form of my invention, consisting, essentially, in the substitution of a cord $p$ for the other fastening means for the crupper, (shown in Fig. 1,) the said cord being attached to each end of the crupper $w$ and then run through the openings $o$ in the blanket, thence through the loops $s$ and $t$ to a point of connection at each end of the V-shaped strap $b$. In this latter form of my invention it will be seen that the manner of attaching the ends of the crupper to a cord, as shown, permits a reasonable amount of movement of the animal without displacing the blanket. The essential feature of my invention, however, lies in the attachment of the crupper to the blanket, thus aiding in preventing displacement of the latter.

Having described my invention, what I claim as new, and desire to secure by Letters Patent, is—

1. A horse-cover, comprising a blanket, openings therein, cords attached to the forward ends of the blanket and being run through said openings to connect with a crupper, and a detachable crupper connected to the free ends of said cords.

2. A horse-cover, comprising a blanket, openings therein, loops on said blanket, cords attached to said blanket and being run through said loops and said openings to connect with a crupper, and a detachable crupper connected to the free ends of said cords.

3. A horse-cover, comprising a blanket, openings therein, cords attached to said blanket and having their ends run through said openings to connect with a crupper, a detachable crupper connected to the free ends of said cords, and suitable girths connected to said blanket having fastening means.

Signed at Waterloo, Iowa, this 9th day of October, 1905.

THEODORE N. MATHIAS.

Witnesses:
G. C. KENNEDY,
M. E. KENNEDY.